(12) United States Patent
Kamisuwa

(10) Patent No.: US 6,728,008 B1
(45) Date of Patent: Apr. 27, 2004

(54) METHOD FOR DIAGNOSING OPTICAL DEVICES INSTALLED IN IMAGE READING APPARATUS AND IMAGE FORMING APPARATUS

(75) Inventor: Yoshikatsu Kamisuwa, Kawasaki (JP)

(73) Assignees: Kabushiki Kaisha Toshiba, Kawasaki (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/387,512

(22) Filed: Sep. 1, 1999

(30) Foreign Application Priority Data

Sep. 4, 1998 (JP) .......................... 10-251126
Dec. 15, 1998 (JP) .......................... 10-356019

(51) Int. Cl.$^7$ .............................. H04N 1/04; H04N 1/00
(52) U.S. Cl. ...................... 358/474; 358/406; 358/497
(58) Field of Search ................. 358/406, 486, 358/488, 474, 497, 494, 504, 471; 702/185, 184, 183; 250/236, 234; 382/313, 318, 319

(56) References Cited

U.S. PATENT DOCUMENTS

| | | | |
|---|---|---|---|
| 5,361,131 A | 11/1994 | Tekemori et al. | 356/499 |
| 5,539,519 A | 7/1996 | Takagi et al. | 356/499 |
| 5,600,574 A | 2/1997 | Reitan | 702/185 |
| 5,631,686 A | 5/1997 | Castelli et al. | 347/133 |
| 5,798,826 A | 8/1998 | Yamamoto et al. | 356/4.09 |
| 5,847,884 A | 12/1998 | Kamon et al. | 359/806 |
| 6,229,629 B1 * | 5/2001 | Tsai | 358/486 |
| 6,243,173 B1 * | 6/2001 | Lee et al. | 358/488 |
| 6,381,043 B1 * | 4/2002 | Tsai et al. | 358/488 |
| 6,411,405 B1 * | 6/2002 | Yun et al. | 358/488 |
| 6,498,339 B1 * | 12/2002 | Kamisuwa | 250/234 |

FOREIGN PATENT DOCUMENTS

| | | | |
|---|---|---|---|
| JP | 363196035 A | * | 8/1988 |
| JP | 405072492 A | * | 3/1993 |
| JP | 5-188744 | | 7/1993 |
| JP | 9-101642 | | 4/1997 |
| JP | 2659189 | | 6/1997 |
| JP | 9-218470 | | 8/1997 |
| JP | 9-298635 | | 11/1997 |

OTHER PUBLICATIONS

Chen et al., "Scanner with Reference Pattern for Merging Images and Method of Merging Images," US patent application Publication No. US2002/0105683 A1, Aug. 8, 2002.*
Shih et al, "Image Scanning Apparatus Capable of Positioning a Scan–Starting Point." US patent application Publication No. 2002/0159097 A1, Oct. 31, 2002.*
Patent Abstracts of Japan, vol. 017, No. 399 (P–1579), Jul. 26, 1993, Japanese Patent 05–072492 A, published Mar. 26, 1993.
Patent Abstracts of Japan, vol. 017, No. 404 (E–1405), Jul. 28, 1993, Japanese Patent 05–075797 A, published Mar. 26, 1993.
Patent Abstracts of Japan, vol. 1996, No. 08, Aug. 30, 1996, Japanese Patent 08–102818 A, published Apr. 16, 1996.

* cited by examiner

*Primary Examiner*—Cheukfan Lee
(74) *Attorney, Agent, or Firm*—Foley & Lardner

(57) ABSTRACT

In a method for diagnosing an optical device, the positions of intersections between a scanning line and the line segments of an adjustment mark provided in a predetermined position, and output levels at the intersections are detected on the basis of the output characteristic of an output level corresponding to each pixel position and obtained by reading the adjustment mark along the scanning line. The detected output levels are compared with a predetermined value to detect an error due to the attachment position of the optical device.

10 Claims, 10 Drawing Sheets

METHOD FOR DIAGNOSING OPTICAL DEVICES INSTALLED IN IMAGE READING APPARATUS AND IMAGE FORMING APPARATUS

BACKGROUND OF THE INVENTION

This invention relates to a method for diagnosing an optical device, and more particularly to a method for diagnosing both optical devices installed in a scanner section and a printer section that are incorporated in, for example, a digital copy machine.

Image forming apparatuses such as digital copy machines comprise a scanner section for optically reading a document image and creating image data, and a printer section for forming an image on a sheet of paper on the basis of the image data. The scanner section and the printer section each include an optical device equipped with a plurality of optical systems. Since the optical device is manually adjusted by a skilled worker in the manufacturing process of the image forming apparatus, lots of time is required for the adjustment of the optical device, and the adjustment precision is unstable.

In order to shorten the required adjustment time and stabilize the adjustment precision, research for expressing the amount of displacement with a numerical value by using an exclusive chart to realize automatic adjustment is now being made.

Japanese Patent Application KOKAI Publication No. 8-102818 discloses a method for detecting displacements in the main scanning direction and the sub scanning direction, and also detecting errors in magnification in these directions, using a mark that has its width linearly varied in the sub scanning direction and has an edge parallel to the main scanning direction. The detection method using such a mark, however, cannot detect another displacement or error.

Japanese Patent Application KOKAI Publication No. 5-75797 proposes a chart for adjustment that enables the detection of another adjustment item. However, in this method, a large number of detection marks must be used in the chart, a large number of detection positions are required, and lots of detection time is required.

Moreover, the conventional chart is only applicable to the adjustment of an optical device employed in the scanner section, but not to the adjustment of the entire image forming apparatus including the scanner section and the printer section.

In addition, in a so-called complex-type digital copy machine that has a fax function and/or a printer function as well as a copy function, the reading performance of the scanner section alone, the printing performance of the printer section alone, or the performance of the entire apparatus significantly influences the image quality realized by each function. Therefore, it is necessary to diagnose the performance of each section.

BRIEF SUMMARY OF THE INVENTION

The present invention has been developed to solve the aforementioned problems, and is aimed at providing a method of diagnosing an optical device and capable of always providing stable image quality at low cost and using a simple system.

According to an aspect of the invention, there is provided a method of diagnosing an optical device having a plurality of photoelectric elements that are arranged in a scanning line in a main scanning direction, for receiving light reflected from a document and outputting a signal corresponding to an amount of light received, comprising:

a first step of reading, along a predetermined scanning line, a figure that consists of a first straight line perpendicular to the main scanning direction, second and third straight lines parallel to each other and intersect the first straight line at an acute angle, using the photoelectric elements of the optical device opposed to the figure with a predetermined space interposed therebetween;

a second step of detecting respective positions of first, second and third intersections between the scanning line and each of the first, second and third straight lines of the figure, and also detecting output levels of signals corresponding to the intersections, on the basis of signals output when the figure has been read along the scanning line; and a third step of comparing the detected positions of the intersections with positions of respective predetermined points which are to detect the intersections, and the detected output levels of the signals corresponding to the intersections with respective predetermined output levels of signals corresponding to respective predetermined points, thereby detecting an error due to an attachment position of the optical device.

According to another aspect of the invention, there is provided a method of diagnosing an optical device installed in an apparatus that is equipped with reading means for reading a document image and storage means for storing reference data corresponding to a predetermined image pattern, comprising:

a first step of reading the predetermined pattern and converting the read pattern into image data, using the reading means; and a second step of comparing the image data with the reference data stored in the storage means, thereby detecting a first image reading characteristic due to displacement of at least one component of the reading means from a predetermined position, and a second image reading characteristic due to deviation of a control parameter from a predetermined value, which occurs at the time of conversion to the image data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Diagnosis methods for optical devices according to the embodiments of the invention will be described with reference to the accompanying drawings.

Figure 1:
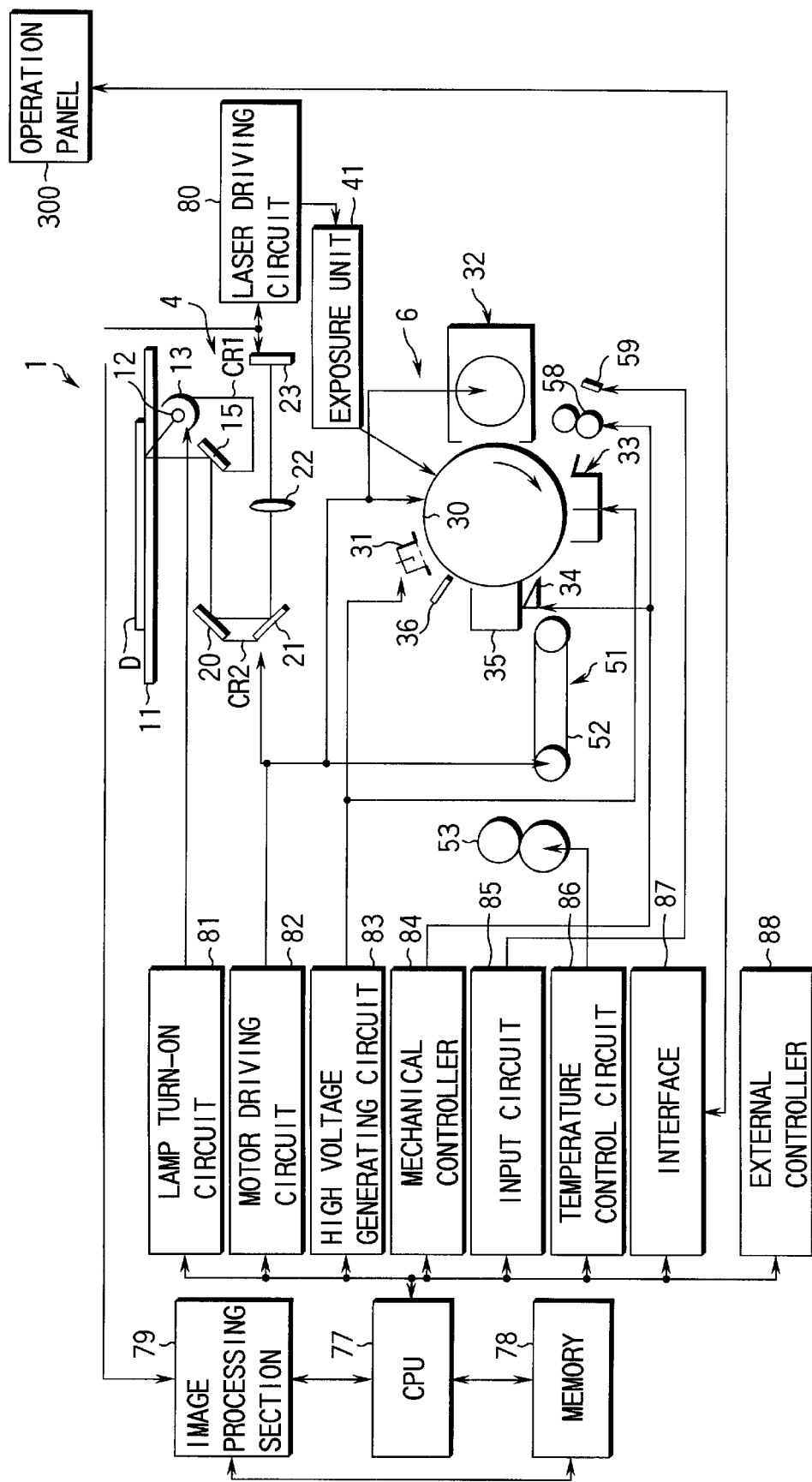
FIG. 1 is a view, schematically illustrating a section of a digital copy machine equipped with an optical device to which the diagnosis method of the invention is applied, and a control system incorporated in the copy machine to control it.
Figure 2:
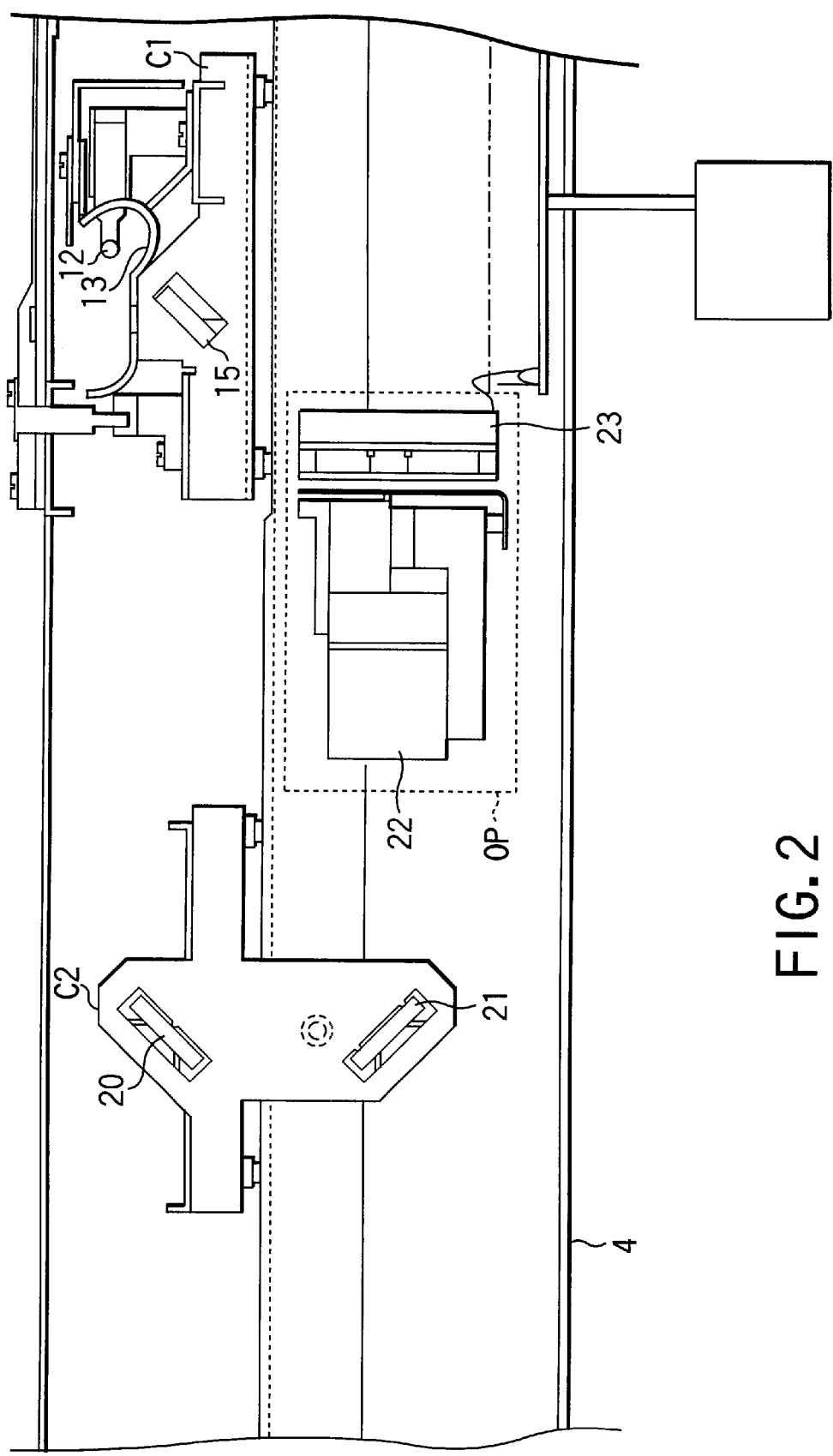
FIG. 2 is a sectional view,. schematically illustrating a scanner section incorporated in the digital copy machine of FIG. 1.

FIG. 1 schematically shows a section of a digital copy machine as an example of an image forming apparatus, and also shows a control system for controlling the copy machine. FIG. 2 is an enlarged view of a scanner section employed in the copy machine of FIG. 1.

As is shown in FIG. 1, the digital copy machine includes a scanner section 4 as an image reading section, and a printer section 6 as an image forming section.

As is shown in FIGS. 1 and 2, the scanner section 4 has a document table 11 located on the upper surface of the machine main body and formed of transparent glass for mounting thereon a document D. A first carriage CR1 is provided below the document table 11. The first carriage CR1 has an exposure lamp 12 for illuminating a document D mounted on the document table 11, a reflector 13 for reflecting light from the exposure lamp 12 to the document D, and a first mirror 15 for bending light reflected from the document D in a predetermined direction.

A second carriage CR2 is provided obliquely below the document table 11 in a direction in which the light reflected from the first mirror 15 is guided. The second carriage CR2 has a second mirror 20 for further bending the light reflected from the document D and bent by the first mirror 15, and a third mirror 21 located at right angles to the second mirror 20. The second carriage CR2 is driven by the first carriage CR1 through, for example, a driving toothed belt. The second carriage CR2 is moved along the document table 11 at a rate ½ of that of the first carriage CR1.

An optical device OP that has an image forming lens 22 and a CCD line sensor 23 is provided below the first carriage CR1 in a plane which includes the optical axis of the light bent by the second carriage CR2. The image forming lens 22 can be moved by a driving mechanism (not shown), and is arranged to converge the light reflected from the second carriage CR2 and to be moved so as to form an image corresponding to the light at a predetermined magnification. The CCD line sensor 23 is formed of a plurality of photoelectric elements corresponding to pixels arranged in line on the image forming plane of the image forming lens 22 in the main scanning direction, and creates an electric signal corresponding to the amount of light that has entered each pixel.

As is shown in FIG. 1, the printer section 6 includes a photosensitive drum 30, a charger 31, an exposure unit 41, a developing unit 32, a transfer/release charger 33, a release claw, a cleaner unit 35 and a deelectrifying unit 36.

The photosensitive drum 30 is rotatably located at a substantially central portion of the machine main body. The charger 31 charges the surface of the photosensitive drum 30 with predetermined static electricity. The exposure unit 41 has a semiconductor laser for emitting a laser beam having its intensity adjusted on the basis of image data, and is disposed to emit a laser beam onto the charged surface of the photosensitive drum 30 to thereby form an electrostatic latent image thereon. The developing unit 32 supplies toner to the electrostatic latent image on the photosensitive drum 30, thereby developing the latent image at a desired image density. The transfer/release charger 33 is used to transfer a toner image formed on the photosensitive drum 30, onto a sheet of paper fed from a sheet cassette, and to release the paper sheet with the toner image from the photosensitive drum 30. The release claw 34 releases the paper sheet from the photosensitive drum 30. The cleaner unit 35 removes the toner that remains on the photosensitive drum 30 to clean the drum. The deelectrifying unit 36 removes the potential that remains on the photosensitive drum 30.

A conveyance belt 52 for conveying paper sheets is provided downstream of the photosensitive drum 30 along a conveyance path 51 through which the sheet with the toner image is conveyed. A fixing unit 53 is provided downstream of the conveyance belt 52. The fixing unit 53 has a pair of heat rollers having their surfaces made in pressure contact with each other. The fixing unit 53 heats and melts a toner image on a paper sheet between the heat rollers while pressing the sheet with the toner image therebetween, thereby fixing the toner image on the sheet.

A pair of timing rollers 58 are provided along the conveyance path 51 in the vicinity of and upstream of the photosensitive drum 30. The timing rollers 58 are adapted to feed a paper sheet to the transfer section at the same speed as that of the outer peripheral surface of the photosensitive drum 30, with an inclination of the paper sheet, guided along the conveyance path 51, corrected, and the front edge of a toner image on the photosensitive drum 30 aligned with that of the paper sheet. A timing sensor 59 is provided near the timing rollers 58 for sensing whether a paper sheet has reached the rollers 58.

Further, an operation panel 300 for inputting various information to the copy machine is provided in the vicinity of the document table 11. The panel has a display section for displaying input information or the operation state of the copy machine.

The copy machine also comprises a CPU 77 as control means, a memory 78, an image processing section 79 and a laser driving circuit 80 which are connected to the CPU 77. The memory 78 functions as storage means for temporarily storing programs for operating the copy machine, image data corresponding to an image signal generated by the CCD line sensor 23, i.e. corresponding to an original document image, reference image data corresponding to a predetermined image pattern or chart to be used as a reference pattern in a diagnosis mode which will be described later, and other data input through, for example, the operation panel 300. The image processing section 79 performs predetermined image processing on image data created by the CCD line sensor 23. The laser driving circuit 80 controls the semiconductor laser of the exposure unit 41 on the basis of the image data.

The CPU 77 is further connected to a lamp turn-on circuit 81, a motor driving circuit 82, a high voltage generating circuit 83, a mechanical controller 84, an input circuit 85, a temperature control circuit 86, an interface 87, an external controller 88, etc.

The lamp turn-on circuit 81 controls the turn-on and turn-off of the exposure lamp 13. The motor driving circuit 82 rotates, at respective rotational speeds, a pulse motor for moving the first and second carriages CR1 and CR2, a main motor for rotating the photosensitive drum 30 and the developing unit 32, a small motor for driving the conveyance belt 52, etc. The high voltage generating circuit 83 supplies a predetermined voltage to the charger 31 and the transfer/release charger 33. The mechanical controller 84 controls the turn-on and turn-off of, for example, a solenoid used in the release claw 34, the cleaner unit 35, the timing rollers 58, etc. The input circuit 85 receives on/off signals from a plurality of sensors such as the timing sensor 59. The temperature control circuit 86 controls the fixing temperature of the fixing unit 53. The interface 87 connects the CPU 77 to an input device such as the operation panel 300. The external controller 88 transmits and receives data to and from external devices via a communication line or a modem.

A method for diagnosing an optical device, which is applied to the above-described digital copy machine, will be described.

First, a description will be given of a diagnosis method used at the time of adjustment of an optical device OP during the manufacture of the scanner section 4.

Figure 3:
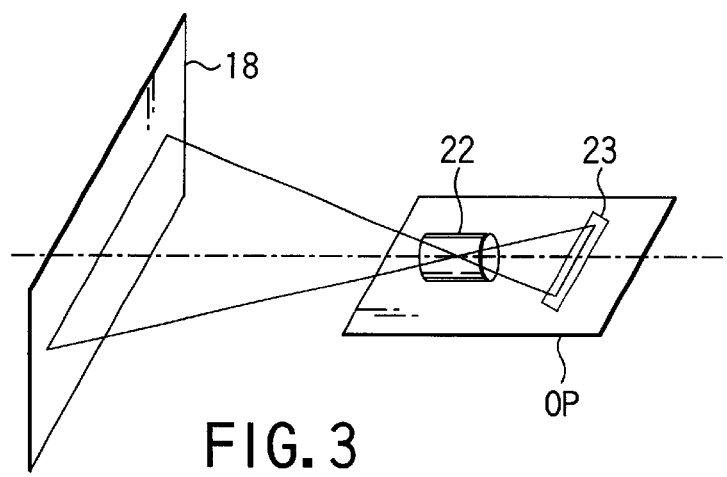
FIG. 3 is a view, useful in explaining a method for detecting a displacement of an optical device in the former stage of a process.
Figure 4:
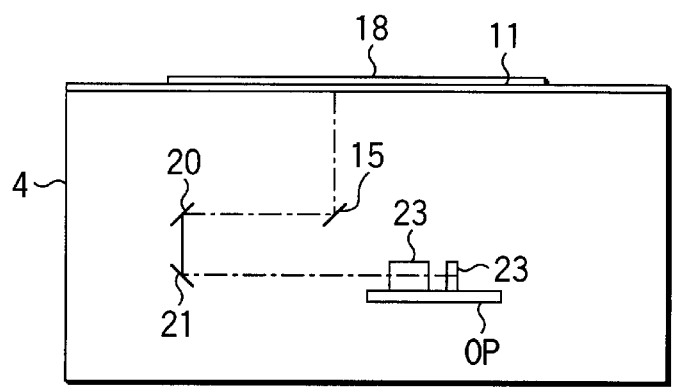
FIG. 4 is a view, useful in explaining a method for detecting a displacement of a scanner section in the latter stage of the process.

The adjustment process of the optical device OP of the scanner section 4 comprises a former stage as shown in FIG. 3 and a latter stage as shown in FIG. 4. In the former stage, the degree of misalignment of the image forming lens 22 of the optical device OP and the CCD line sensor 23 is measured, and adjustment is performed on the basis of the measurement result. In the latter stage, the optical device OP having adjusted in the former stage is inserted into the scanner section 4, and then the degree of misalignment of each element of the scanner section 4 and the optical device OP is measured, thereby performing adjustment based on the measurement results.

In the former stage, a chart for exclusive use in diagnosis is located on a surface of a predetermined object surface, and a chart image formed through the image forming lens 22 of the optical device OP is sensed by the CCD line sensor 23, thereby detecting a change in distance between the image forming lens 22 and the CCD line sensor 23 and/or the degree of parallelization therebetween on the basis of the output of the CCD line sensor 23. The distance and/or the parallelization between the lens 22 and the sensor 23 is adjusted on the basis of the detection result.

In the latter stage, the optical device OP adjusted in the former stage is inserted into the scanner section 4, thereby adjusting the positional relationship between the chart for exclusive use in diagnosis placed on the document table 11 that corresponds to the object surface, and the CCD line sensor 23 corresponding to the image surface. In other words, detected are the degree of distortion of an image read by the scanner section 4 relative to an original document on the document table 11, or errors in magnification, focus, etc. of the optical system, due to the optical relationship between the object surface and the image surface. On the basis of the detection results, the relative relationship, such as the distance, between each element of the scanner section 4 and the optical device OP is adjusted.

Figure 5:
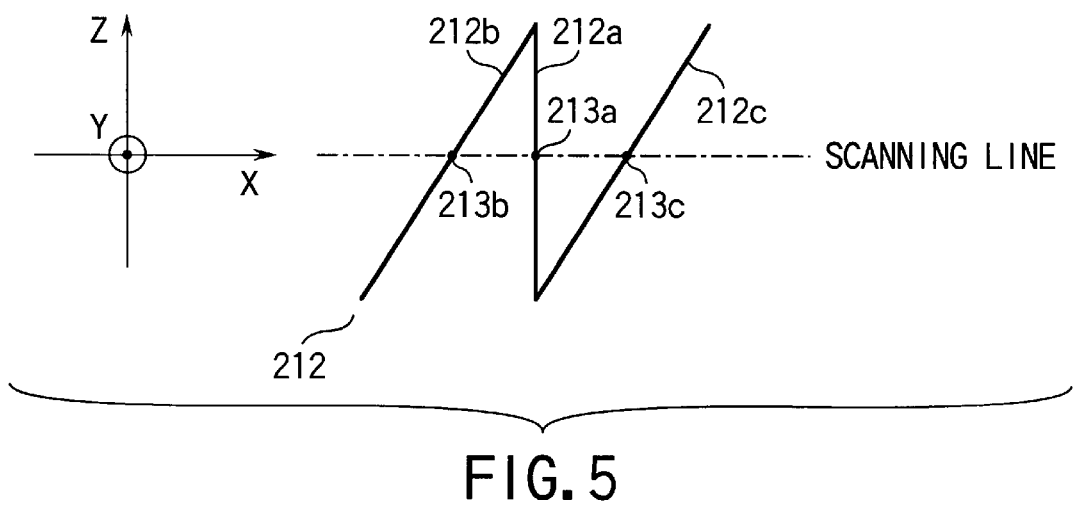
FIG. 5 is a view showing an example of a mark for adjustment in a diagnosis chart that is used in the diagnosis method of the invention.

A chart 18 for exclusive use in diagnosis has, for example, an image pattern as shown in FIG. 5, i.e. an adjustment mark 212.

Specifically, the adjustment mark 212 includes a line segment 212a perpendicular to the main scanning direction (=the direction of the X-axis in FIG. 5) and a pair of parallel line segments 212b and 212c that intersect the main scanning direction at a predetermined angle.

The line segment 212a has one end intersecting one end of the line segment 212b at an acute angle, and the other end intersecting one end of the line segment 212c at an acute angle. Further, the angle (angle of inclination) formed between the line segments 212a and 212b and between the line segments 212a and 212c is set in accordance with the detection sensitivity, and set at, for example, 45° in the FIG. 5 case.

The adjustment mark 212 is formed such that when the scanner section 4 scans a scanning line in a direction parallel to the main scanning direction to pass the center of the line segment 212a, the distance between the intersections of the scanning line and the line segments 212a and 212b is equal to that between the intersections of the scanning line and the line segments 212a and 212c. In other words, the distance between the intersections 213a and 213b is set equal to that between the intersections 213a and 213c.

Figure 6:
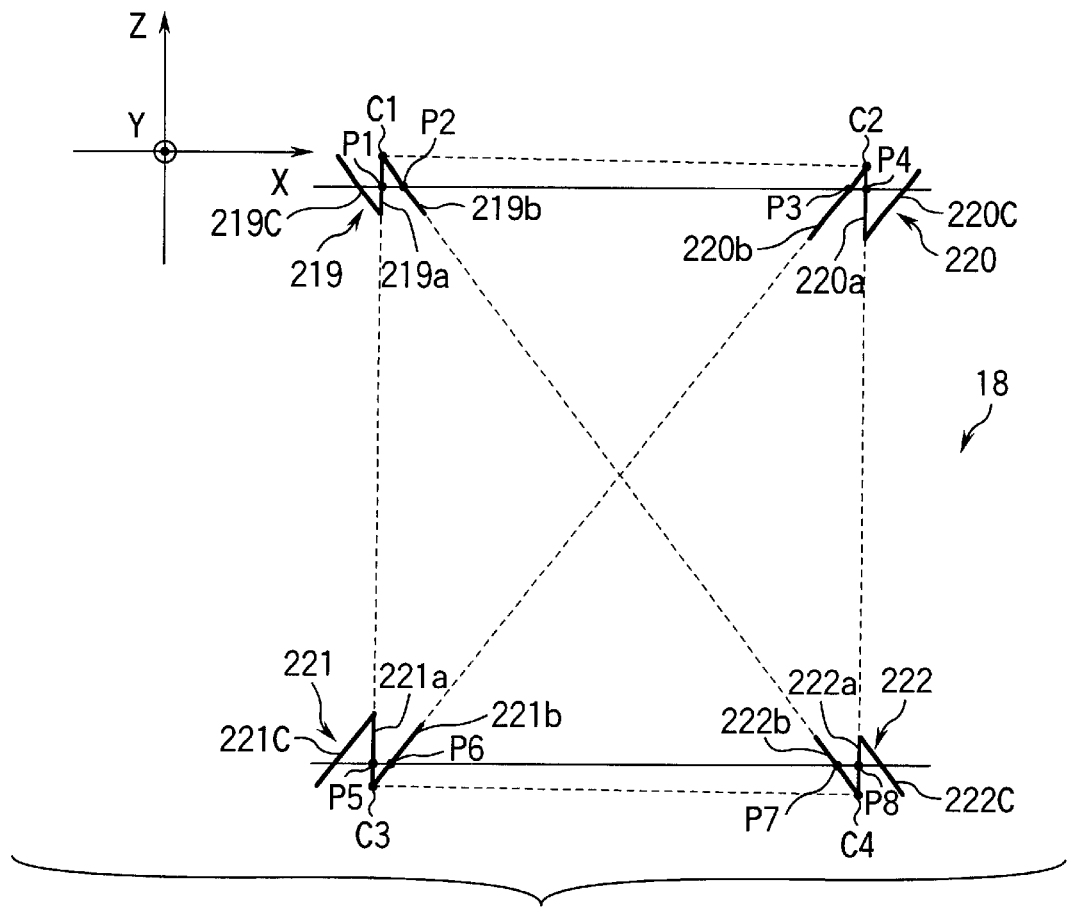
FIG. 6 is a view showing an example of a diagnosis chart used in the diagnosis method of the invention.

Actually, the chart 18 for exclusive use in diagnosis comprises four adjustment marks, i.e. a first mark 219, a second mark 220, a third mark 221 and a fourth mark 222, as is shown in FIG. 6. The first to fourth marks 219–222 are arranged such that an intersection C1 between the line segments 219a and 219b of the first mark 219, an intersection C2 between the line segments 220a and 220b of the second mark 220, an intersection C3 between the line segments 221a and 221b of the third mark 221, and an intersection C4 between the line segments 222a and 222b of the fourth mark 222 form the four corner points of a rectangle.

In the chart 18, the line segment 219a of the first mark 219 and the line segment 221a of the third mark 221 are situated on the same straight line. Similarly, the line segment 220a and the line segment 222a, the line segments 219b and 222b, the line segments 220b and 221b are also situated on the respective straight lines. Further, sides C1C2, C2C3, C3C4 and C4C1 constitute the sides of a rectangle, while the line formed by connecting C1 to C4 and the line formed by connecting C2 to C3 constitute the diagonal lines of the rectangle.

The former process will now be described.

Figure 7:
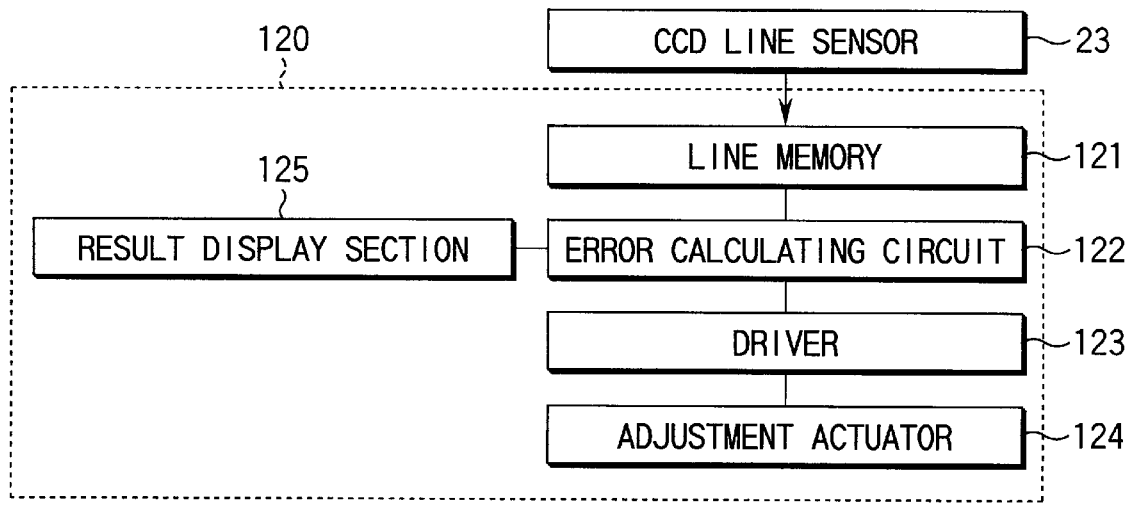
FIG. 7 is a block diagram useful in roughly explaining the structure of an adjustment apparatus.

FIG. 7 is a block diagram schematically illustrating the structure of a control system incorporated in an adjustment device 120 used in the former process of the diagnosis method for the optical device OP.

The adjustment device 120 comprises a line memory 121, an error calculating section 122, a driver 123, an adjustment actuator 124 and a result display section 125. While the CCD line sensor 23 performs scanning by one or more scanning lines in the main scanning direction, the line memory 121 stores signals output from the CCD line sensor 23 of the optical device OP provided in a predetermined position. The error calculating section 122 calculates various errors on the basis of an output signal corresponding to each pixel in the scanning lines, and stored in the line memory 121. The adjustment actuator 124 adjusts the positional relationship between the CCD line sensor 23 and the image forming lens 22 of the optical device OP on the basis of the calculation results of the error calculating section 122. The driver 123 controls the operation of the adjustment actuator 124 based on the calculation results of the error calculating section 122. The result display section 125 displays the calculation results of the error calculating section 122.

In the adjustment device 120, the positional relationship between the chart 18 with the adjustment mark 212 and the optical device OP is set such that the optical path extending between the chart and the optical device has the same length as that extending from the document surface of the document table 11 to the CCD line sensor 23 when the optical device OP is mounted in the scanner section 4. At this time, the chart 18 is located on the object surface of the image forming lens 22, and the main-scanning-directional scanning line perpendicularly intersects the line segment 212a of the adjustment mark 212 such that the distance between the intersections 213a and 213b is equal to that between the intersections 213a and 213c.

The chart 18 enables diagnosing of the following to-be-diagnosed items (hereinafter referred to as "diagnosis items") in the former stage. Hereinafter suppose that the main scanning direction, the sub scanning direction, and the beam advancing direction are expressed by the X-axis, the Z-axis and the Y-axis, respectively, and that the directions of rotation about the X-, Z- and Y-axes are expressed by θx, θz and θy, respectively.

Thus, various errors can be detected by reading, using the scanner section 4, one (212) of the adjustment marks included in the chart 18.

Figure 8:
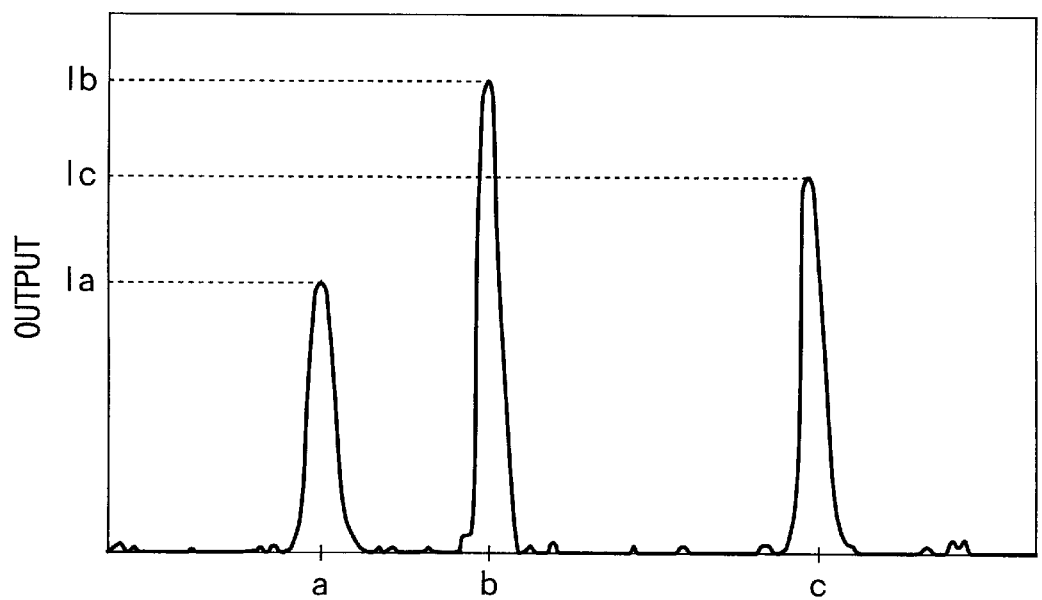
FIG. 8 is a graph, showing examples of output characteristics indicative of the relationship between the output result of a CCD line sensor, installed in an unadjusted optical device, and the pixel position, which is obtained when the CCD line sensor has read an adjustment mark.
Figure 9:
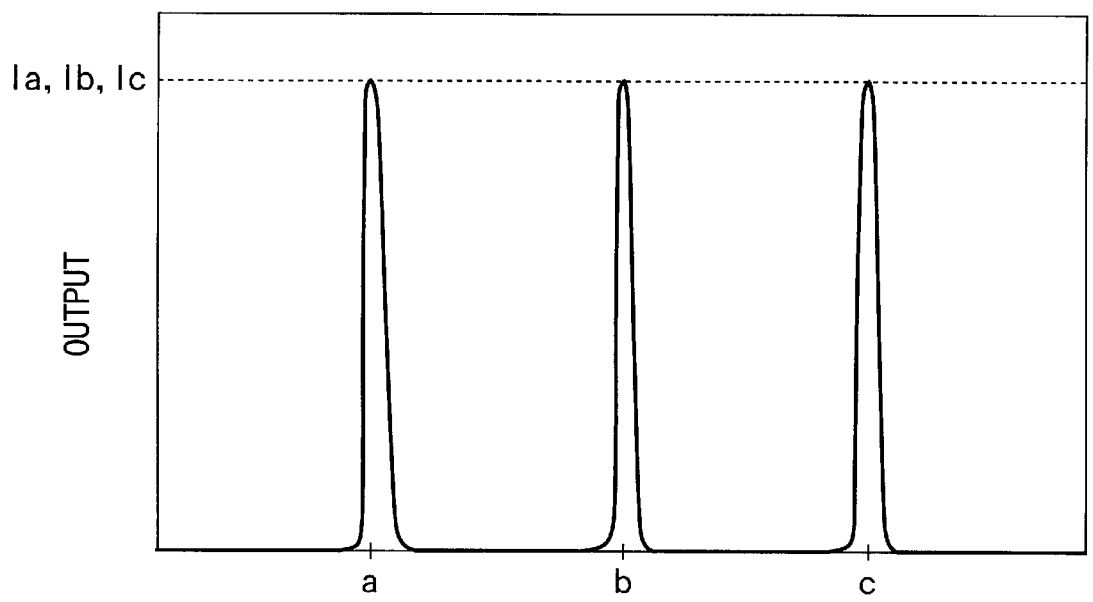
FIG. 9 is a graph, showing ideal output characteristics obtained when a CCD line sensor, installed in an ideally adjusted optical device, has read an adjustment mark.

FIGS. 8 and 9 are graphs, illustrating the relationship between the pixel position and the output level of the CCD line sensor 23, assumed when the adjustment mark 212 is read by the CCD line sensor 23. The abscissa indicates the pixel position on the CCD line sensor 23, while the ordinate indicates the output level of the CCD line sensor 23 corresponding to the pixel position. More specifically, FIG. 8 shows examples of the output characteristics of the CCD line sensor 23 installed in the optical device OP before adjustment. FIG. 9 shows ideal output characteristics of the sensor 23 obtained after it is adjusted in the former stage.

As is shown in FIGS. 8 and 9, the output characteristics of the CCD line sensor 23 corresponding to the positions of pixels that have read the adjustment mark 212 shown in FIG. 5 are expressed as a waveform with three peaks. The positions of the three peaks correspond to the respective intersections 213a, 213b and 213c between the main-scanning-directional scanning line and the line segments 212a, 212b and 212c of the adjustment mark 212. In other words, the peak positions a, b and c on the main-scanning-directional scanning line correspond to a pixel that has read the line segment 212a, a pixel that has read the line segment 212b, and a pixel that has read the line segment 212c, respectively.

It can be detected, from the three peak positions a, b and c and their peak levels Ia, Ib and Ic, to what a degree the position of each pixel of the CCD line sensor 23, which has read the adjustment mark, is deviated from a predetermined position (ideal position).

If the CCD line sensor 23 and the image forming lens 22 are situated in respective ideal positions on the substrate of the optical device OP, the distance between the peak positions a and b is equal to that between the peak positions b and c, and the peak levels Ia, Ib and Ic are set at respective predetermined maximum values. If there is no variation in output level between the photosensitive elements of the CCD line sensor 23, the peak levels Ia, Ib and Ic are set at the same output level.

As described above, the adjustment device 120 compares, with ideal output characteristics, the output characteristics of the CCD line sensor 23 of the optical device OP, which are obtained when the sensor 23 reads one adjustment mark 212 of the chart 18, thereby detecting various errors.

For example, reading one adjustment mark 212 as shown in FIG. 5 enables detection of an X-directional (main-scanning-directional), Y-directional, or Z-directional (sub-scanning-directional) displacement of the CCD line sensor 23, or a θy-directional displacement of the CCD line sensor 23 (i.e. a main-scanning-directional inclination of the CCD lien sensor 23) or an error due to a θz-directional inclination of the CCD line sensor 23 (i.e. an inclination of the CCD line sensor 23 in the direction of rotation about the Z-axis).

The X-directional (main-scanning-directional) displacement is detected as follows: First, the coordinates of the intersection 213a between the scanning line and the line segment 212a is detected. Then, the detected coordinates of the intersection 213a are compared with predetermined or ideal ones, thereby determining a main scanning directional displacement of the CCD line sensor 23.

The Y-directional displacement (focus error) indicates, in the scanner section 4, a displacement of the image surface due to the optical relationship between the CCD line sensor 23 and the image forming lens 22, and indicates, in the printer section 6, a displacement of the image surface due to the optical relationship between the exposure unit 41 and the photosensitive drum 30. The errors in focus are detected on the basis of the output level Ia of the CCD line sensor 23 obtained when it has detected the intersection 213a. More specifically, the errors are detected by determining the degree of deviation of the output level Ia from a predetermined maximum value.

The Z-directional (sub-scanning-directional) displacement is detected on the basis of the difference in the distance between the intersections 213a and 213b and the distance between the intersections 213b and 213c. A sub-scanning-directional displacement of the scanning line of the CCD line sensor 23 is detected on the basis of the degree of deviation of the difference from a value of 0 or a predetermined minimum value.

The θy-directional error (i.e. the main-scanning-directional inclination of the optical device OP) is detected from the distance between the intersections 213a and 213c. An inclination of the scanning line of the CCD line sensor 23 with respect to the scanning surface of the chart 18 is detected on the basis of the degree of deviation of the distance between the intersections 213a and 213c from a predetermined value.

The error due to the θz-directional inclination (i.e. the inclination of the CCD line sensor 23 in the direction of rotation about the Z-axis) is detected by comparing the output level Ib of the CCD line sensor 23 obtained when the intersection 213b is detected, with the output level Ia of the CCD line sensor 23 obtained when the intersection 213a is detected. Specifically, an inclination of the CCD line sensor 23 in the direction of rotation about the Z-axis with respect to the chart 18 is detected on the basis of a focus error in the coordinate position of the intersection 213b detected from the difference between the output level Ib and a predetermined maximum value, and also on the basis of a focus error in the coordinate position of the intersection 213a detected from the difference between the output level Ia and a predetermined maximum value.

In the case of a color scanner, three line sensors, which consist of photoelectric elements corresponding to three colors, red (R), green (G) and blue (B), are provided parallel to each other in the Z-axis direction. In this case, an error due to an inclination of a color CCD line sensor 23 in the θx direction (the direction of rotation about the X-axis) can be detected by comparing a focus error detected from an output level Ib corresponding to each color with a predetermined maximum value.

Further, an error in the θy direction and an error in magnification can be detected by reading the two adjustment marks 219 and 220 arranged in the main scanning direction in the chart 18 shown in FIG. 6.

The θy directional error is detected on the basis of the difference between a Z-axis directional error Z1 detected from the first mark 219 of the chart 18, and a Z-axis directional error Z2 detected from the second mark 220. An inclination of the scanning line of the CCD line sensor 23 with respect to the chart 18 is detected from the degree of deviation of the difference between the errors Z1 and Z2 from a value of 0 or a predetermined minimum value. Thus, the use of two adjustment marks enables detection of errors with high accuracy than in the case of using only one adjustment mark.

An error in magnification can be detected by comparing, with a predetermined distance corresponding to a set magnification, the distance between an intersection P1 of the scanning line and the line segment 219a of the first mark 219, and an intersection P4 of the scanning line and the line segment 220a of the second mark 220. In other words, the distance between X-axis directional coordinates P1 and P4 detected from the first and second marks 219 and 220 of the chart 18, as shown in FIG. 6, is compared with a predetermined distance corresponding to a set magnification, thereby detecting an error in magnification.

As described above, in the former stage, first, adjustment marks provided in predetermined positions are read by scanning one scanning line using the CCD line sensor 23 of the optical device OP, thereby detecting the intersection of the scanning line and each line segment of the adjustment marks, and also detecting an output level at the intersection. Comparison of the detected values with predetermined ideal values enables simultaneous detection of a main-scanning-directional error or displacement of the CCD line sensor, a sub-scanning-directional error or displacement of the CCD line sensor, a focus error, a main-scanning-directional inclination of the CCD line sensor, an inclination of the to-be-scanned surface (i.e. the chart), an inclination of the CCD line sensor in the direction of rotation about the X-axis, and an error in magnification.

The above errors are detected by the error calculating section 122 of the adjustment device 120. Each detected error is displayed on the result display section 125. Further, on the basis of each detected error, the driver 123 is controlled so as to drive the adjustment actuator 124 to adjust each error detected in the former stage.

The latter stage will now be described.

Figure 10:
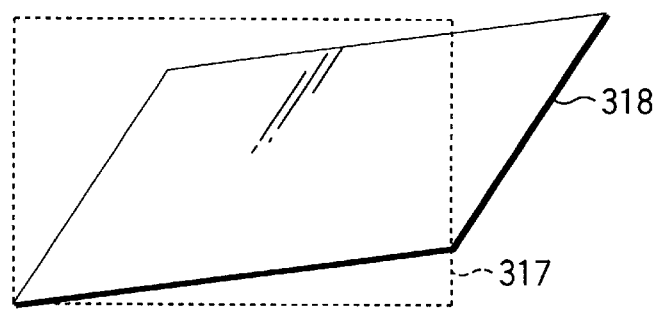
FIG. 10 is a view useful in explaining distortion of an image read by the scanner section.

In the latter stage, the optical device OP that has the image forming lens 22 and the CCD line sensor 23 adjusted to positions on the basis of the errors detected in the former stage is fixed at a predetermined location in the scanner section 4, whereby an error in the positional relationship between the document surface and the optical device OP assumed via first, second and third mirrors 15, 20 and 21 is detected. Then, deviation of magnification from a set value, distortion of an image, and a positional error of the chart in the main scanning direction or the sub scanning direction on the document surface, which are caused by an error in the attachment position of the optical device OP, are adjusted. The image distortion indicates a distortion caused when the first and/or second carriages CR1, CR2 shifts in the sub scanning direction—a distortion as shown in FIG. 10, in which the angles of corresponding corners differ between an original rectangle 317 and a corresponding FIG. 318 obtained by reading the rectangle 317.

As aforementioned with reference to FIG. 6, the latter stage employs the chart 18 that has four adjustment marks, i.e. a first mark 219, a second mark 220, a third mark 221 and a fourth mark 222. The first to fourth marks 219–222 are arranged such that an intersection C1 between the line segments 219a and 219b of the first mark 219, an intersection C2 between the line segments 220a and 220b of the second mark 220, an intersection C3 between the line segments 221a and 221b of the third mark 221, and an intersection C4 between the line segments 222a and 222b of the fourth mark 222 form the four corner points of a rectangle.

In the chart 18, the line segment 219a of the first mark 219 and the line segment 221a of the third mark 221 are situated on the same straight line. Similarly, the line segment 220a and the line segment 222a, the line segments 219b and 222b, the line segments 220b and 221b are also situated on respective straight lines. Further, sides C1C2, C2C3, C3C4 and C4C1 constitute the sides of a rectangle, while the line formed by connecting C1 to C4 and the line formed by connecting C2 to C3 constitute the diagonal lines of the rectangle.

The corner points C1–C4 of the rectangle in the chart 18 may be arranged such that the intersections between the line segments 219a and 219c, between 220a and 220c, between 221a and 221c and between 222a and 222c constitute the corner points of the rectangle. In this case, the line segments 219c and 222c and the line segments 220c and 221c are situated on respective straight lines.

In the chart 18, the first to fourth marks each consist of three line segments. However, to detect distortion of an image and an error in magnification, the chart may include four marks, which form a rectangle and each consist of two line segments—a line segment perpendicular to the main scanning direction, and a line segment aligned with a diagonal of the rectangle. For example, the chart may include a first mark 219 consisting of line segments 219a and 219b, a second mark 220 consisting of line segments 220a and 220b, a third mark 221 consisting of line segments 221a and 221b, and a fourth mark 222 consisting of line segments 222a and 222b.

In the latter stage, to adjust the scanner section 4, the chart 18 is placed on the document table 11. In this state, a predetermined scanning line on the first and second marks 219 and 220 and a predetermined scanning line on the third and fourth marks 221 and 222 are read.

From the two read scanning lines detected are intersections P1 and P2 between one scanning line and the line segments 219a and 219b of the first mark 219, intersections P3 and P4 between the one scanning line and the line segments 220a and 220b of the second mark 220, intersections P5 and P6 between the other scanning line and the line segments 221a and 221b of the third mark 221, and intersections P7 and P8 between the other scanning line and the line segments 222a and 222b of the fourth mark 222. Using the detected intersections P1–P8, the corner points C1–C4 of the rectangle can be calculated on the basis of the geometrical properties of the rectangle.

In other words, the intersection between a straight line including the points P1 and P3 and a straight line including the points P2 and P7, the intersection between a straight line including the points P3 and P6 and a straight line including the points P4 and P8, the intersection between a straight line including the points P5 and P1 and a straight line including the points P6 and P3, and the intersection between a straight line including the points P7 and P2 and a straight line including the points P8 and P4 are calculated as the corner points C1, C2, C3 and C4, respectively.

On the basis of the coordinates of the corner points C1–C4, an error in magnification, image distortion, a positional error of the chart on the document surface are calculated.

An error in magnification is calculated by comparing the distances between the corner points C1–C4 with predetermined distances corresponding to a set magnification. For example, an error in magnification is detected by calculating the difference between each distance between C1 and C2, C2 and C4, C3 and C4, and C1 and C4, i.e. each side of the rectangle formed by the points C1–C4, and a predetermined length corresponding to the set magnification.

The image distortion is detected by comparing the rectangle formed by the detected four corners C1–C4 with a predetermined rectangle. For example, the image distortion is detected on the basis of the difference between the distance between C1 and C3 and that between C2 and C4, i.e. by comparing the diagonals of the rectangle formed of the four points C1–C4, with a predetermined value.

The above manners enable detection of the corner points of the chart 18 even when the chart 18 is slightly displaced from a predetermined position on the document table, whereby image distortion and an error in magnification can be calculated.

Further, an error in reading position can be detected by comparing the coordinates of the four points with predetermined ones.

In the above described latter stage, the attachment position of the optical device OP, or the position or inclination of optical systems in the scanner section 4, such as the first, second and third mirrors 15, 20 and 21, etc., is adjusted on the basis of the detected error(s).

In addition, although in the latter stage, an error in magnification, image distortion, an error in reading position, etc. are detected using the four marks that constitute a rectangle, the latter stage may be modified, as in the former stage, such that one adjustment mark or two adjustment marks arranged in the main scanning direction are placed on the document table 11, thereby reading image data of one scanning line to detect a displacement of the optical device OP in the main scanning direction or in the sub scanning direction, an error in focus, an inclination of the optical device OP with respect to the main scanning direction, an inclination of the optical device OP with respect to the chart, an inclination of the optical device OP in the direction of rotation about the X-axis, etc.

A diagnosis method to be applied to the digital copy machine will be described.

This diagnosis method is applicable to the scanner section 4 alone, the printer section 6 alone, or the entire apparatus. A diagnosis mode in which the diagnosis method is executed can be selected from several modes by the user or the maintenance stuff. When the mode has been selected, each section of the apparatus is diagnosed using a predetermined image pattern or chart 18, or using reference image data corresponding to the chart.

Diagnosis items that can be diagnosed by the diagnosis method include items that can be adjusted in the above-described former and latter stages. Specifically, the diagnosis items include a displacement of the CCD line sensor or the optical device OP in the main scanning direction or in the sub scanning direction, an error in focus, an inclination of the CCD line sensor or the optical device OP with respect to the main scanning direction, an inclination of the CCD line sensor or the optical device OP in the direction of rotation about the X-axis, etc., an error in magnification, image distortion, a main-scanning-directional or sub-scanning-directional displacement of the chart on the document surface.

The above diagnosis items can be sorted into a first characteristic group, which requires adjustment in hardware, due to displacement of each element incorporated in the scanner section 4 and the printer section 6, from a predetermined attachment position, and into a second characteristic group, in which adjustment can be performed in a software manner, due to errors in control parameters for controlling the scanner section 4 and the printer section 6.

When an error has been detected in a diagnosis item included in the first characteristic group, the CPU 77 informs the user or the maintenance stuff of a diagnosis result and a request for adjustment performed by the maintenance stuff.

When, on the other hand, an error has been detected in a diagnosis item included in the second characteristic group, the CPU 77 changes a control parameter or parameters for controlling the image processing section 79, the laser driving circuit 80, the lamp turn-on circuit 81, the motor driving circuit 82, the high voltage generating circuit 83, the mechanical controller 84, the temperature control circuit 86, etc., thereby automatically adjusting the error.

Specifically, an error in reading position in the main scanning direction is adjusted as follows: First, the scanner section 4 reads the adjustment marks of the chart 18 as shown in FIG. 6, temporarily stores, in the memory 78, image data based on the read marks, and detects the reading position of a line segment perpendicular to the main scanning direction. To what degree the detected position is deviated from an ideal position is calculated, and the calculation result is displayed on the display of the operation panel 300 or on an external terminal device via the external controller 88, or is printed by the printer section 6. Then, the value set in a register for setting the image reading position of the CCD line sensor 23 is changed to thereby automatically adjust the position error.

Figure 11:
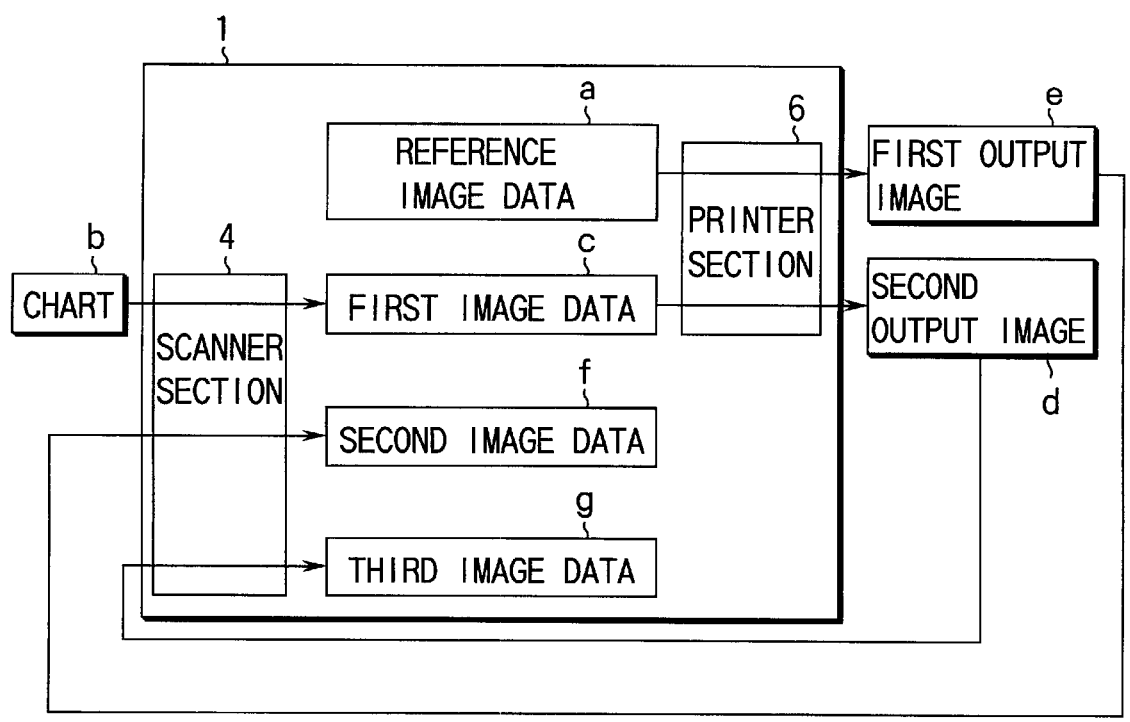
FIG. 11 is a block diagram for explaining the diagnosis method of the invention.
Figure 12:
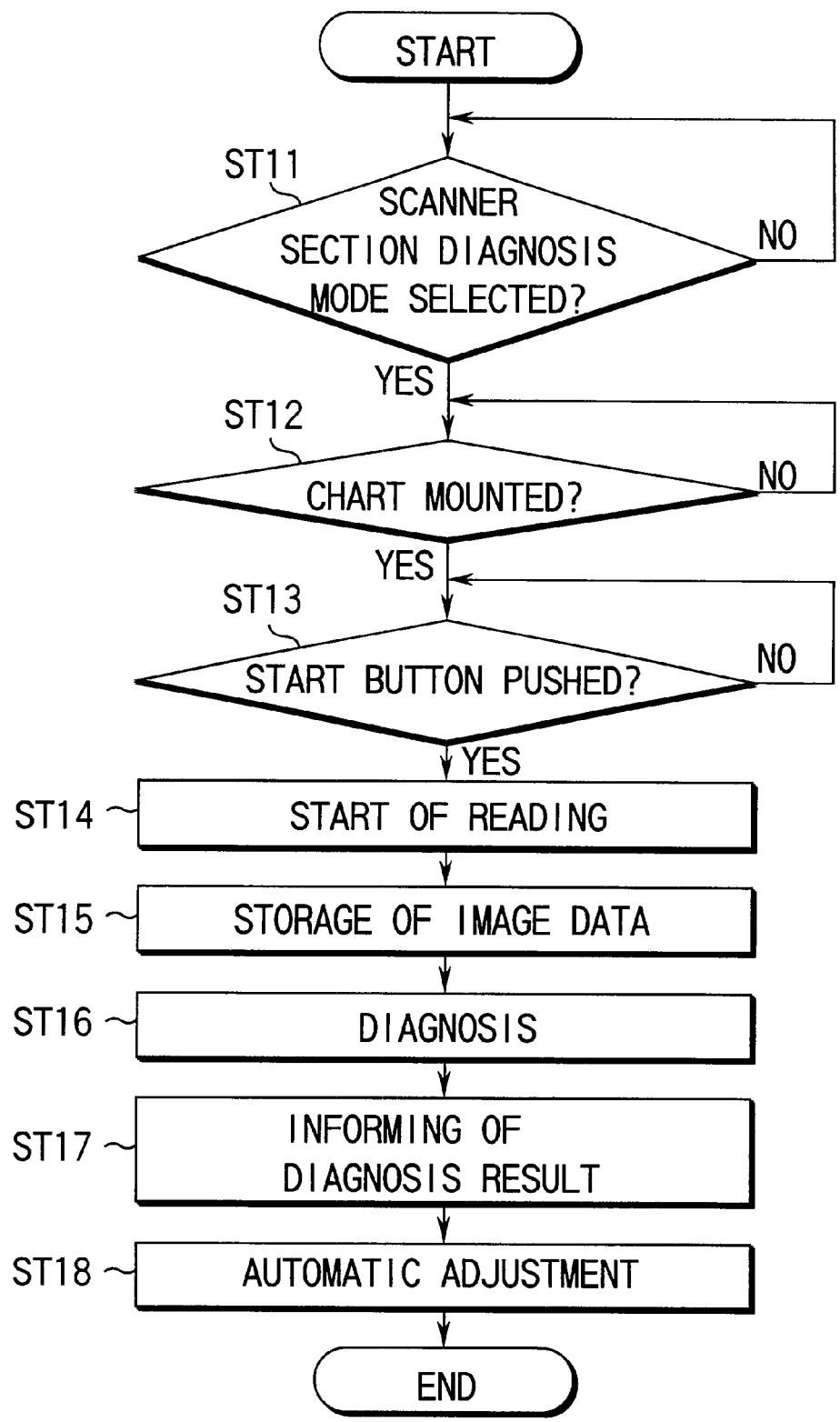
FIG. 12 is a flowchart useful in explaining a method for diagnosing a scanner section as a single body employed in the invention.

Referring to FIGS. 11 and 12, a method for diagnosing the scanner section 4 along will be described.

When the CPU 77 has detected the selection of a scanner diagnosis mode for diagnosing the scanner section 4 alone (the answer to the question of a step ST11 is Yes), it detects whether or not a document with a chart b for diagnosis is placed on the document table 11 (ST12). When the CPU 77 has detected the chart document on the table (the answer to the question of the step ST12 is Yes), it detects whether or not a start button for instructing the start of reading of a document has been pushed (ST13).

When the CPU 77 has detected the pushing of the start button (the answer to the question of the step ST13 is Yes), it drives the scanner section 4 to start reading of the document with the chart b (ST14). First image data c created by reading the chart b is stored in the memory 78 (ST15).

Subsequently, the CPU 77 compares the first image data c with reference image data a corresponding to the chart b and prestored in the memory 78, thereby detecting an error in each diagnosis item for the scanner section 4 (ST16). At this time, the diagnosis items included in the diagnosis results contain items sorted in a first reading characteristic group due to a displacement of a component part of the scanner section, and also items sorted in a second reading characteristic group due to a change in control parameter occurring at the time of conversion to image data. Each item is subjected to error calculation.

The CPU 77 controls the display of the operation panel 300 or an external terminal device via the external controller 88 so as to display the diagnosis result, or controls the printer section 6 so as to print out the result (ST17).

Subsequently, the CPU 77 changes a control parameter corresponding to each item sorted in the second reading characteristic group, thereby performing automatic adjustment (ST18).

As described above, the scanner section alone can be diagnosed using the existing system, which means that a stable reading characteristic can be always obtained at low cost using a simple structure.

Figure 13:
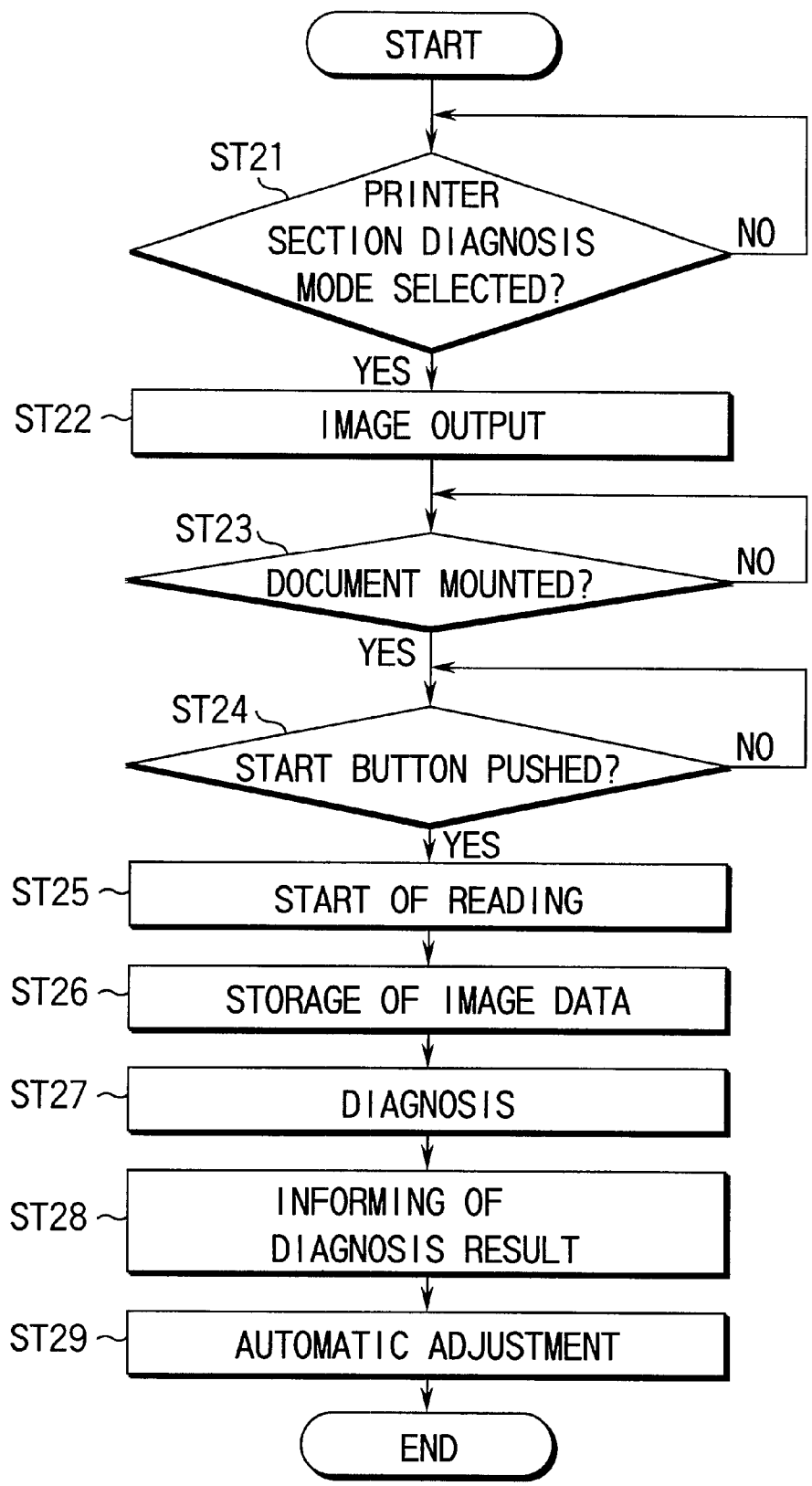
FIG. 13 is a flowchart useful in explaining a diagnosis method for diagnosing a printer section as a single body employed in the invention.

Referring then to FIGS. 11 and 13, a diagnosis method for diagnosing the printer section 6 alone will be described.

When the CPU 77 has detected the selection of a printer diagnosis mode for diagnosing the printer section 6 alone (the answer to the question of a step ST21 is Yes), it drives the printer section 6 to form a first output image e on a sheet of paper on the basis of reference image data a corresponding to a diagnosis chart b (ST22).

Then, the CPU 77 detects whether or not a document with the first output image e is placed on the document table 11 (ST23). When the CPU 77 has detected the document on the table (the answer to the question of the step ST23 is Yes), it detects whether or not a start button for instructing the start of reading of a document has been pushed (ST24).

When the CPU 77 has detected the pushing of the start button (the answer to the question of the step ST24 is Yes), it drives the scanner section 4 to start reading of the document (ST25). Second image data f̲ created by reading the document is stored in the memory 78 (ST26).

Subsequently, the CPU 77 compares the first image data c obtained by reading a chart document prestored in the memory 78, with the second image data f̲, thereby detecting an error in each diagnosis item for the printer section 6 alone, except for an error in each diagnosis item for the scanner section 4 (ST27). In other words, the first image data c contains an error in the scanner section 4, while the second image data f contains errors in both the printer section 6 and the scanner section 4. This being so, an error in the printer section 6 alone can be calculated by comparing the first and second image data items with each other.

At this time, the diagnosis items included in the diagnosis results contain items sorted in a first image forming characteristic group due to a displacement of a component part of the printer section 6, and also items sorted in a second image forming characteristic group due to a change in control parameter occurring at the time of forming an image on a paper sheet. Each item is subjected to error calculation.

The CPU 77 informs the user or the maintenance stuff of the diagnosis results (ST28). Subsequently, the CPU 77 changes a control parameter corresponding to each item sorted in the second image forming characteristic group, thereby performing automatic adjustment (ST29).

As described above, the printer section alone can be diagnosed using the existing system, which means that a stable image forming characteristic can be always obtained at low cost using a simple structure.

Figure 14:
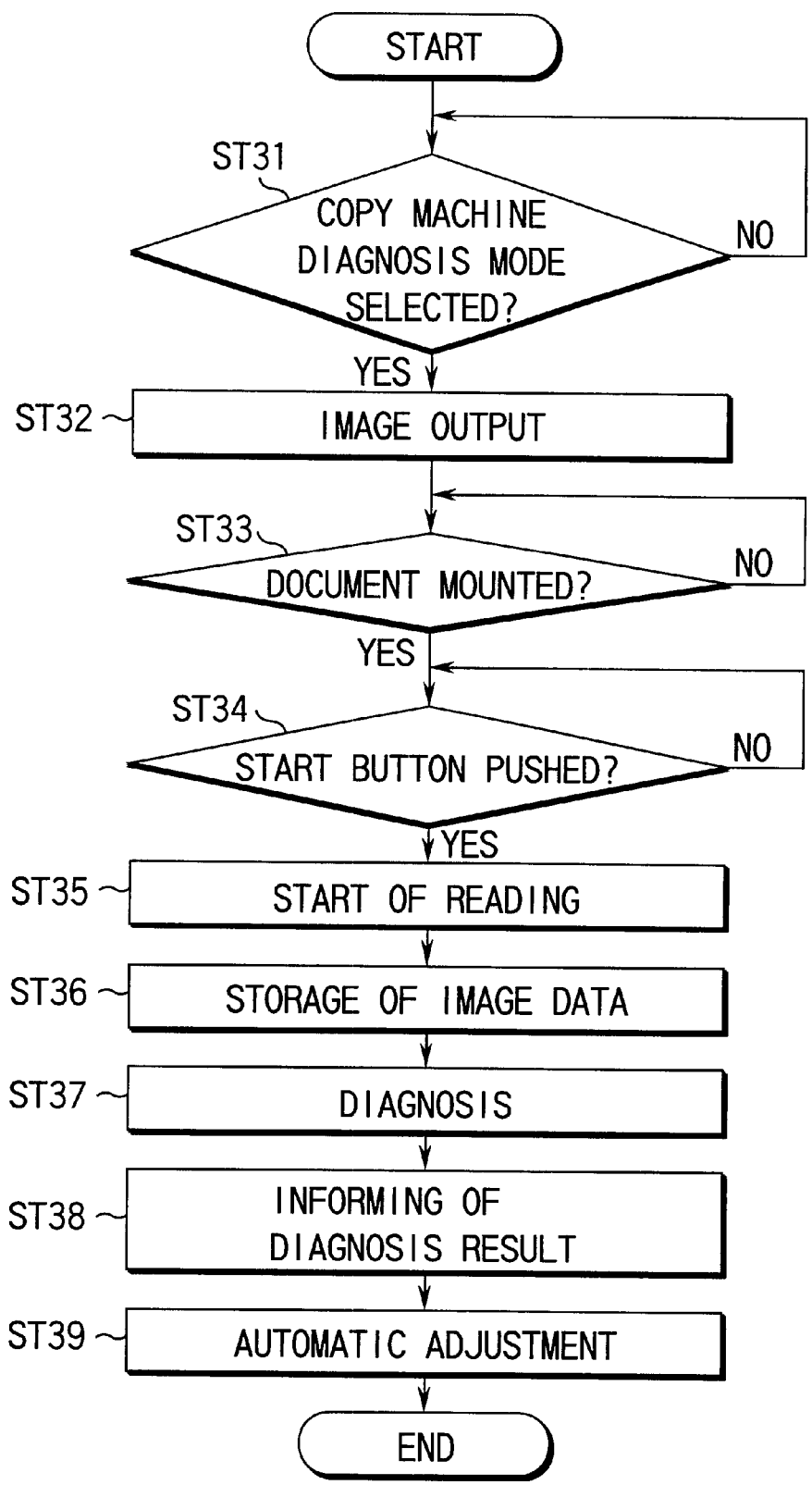
FIG. 14 is a flowchart useful in explaining a first diagnosis method for diagnosing the entire copy machine of the invention.

Referring further to FIGS. 11 and 14, a diagnosis method for diagnosing the entire apparatus will be described.

When the CPU 77 has detected the selection of a copy machine diagnosis mode for diagnosing the entire copy machine 1 (the answer to the question of a step ST31 is Yes), it drives the printer section 6 to form a first output image e on a sheet of paper on the basis of reference image data a corresponding to a diagnosis chart b (ST32).

Then, the CPU 77 detects whether or not a document with the first output image e is placed on the document table 11 (ST33). When the CPU 77 has detected the document on the table (the answer to the question of the step ST33 is Yes), it detects whether or not a start button for instructing the start of reading of a document has been pushed (ST34).

When the CPU 77 has detected the pushing of the start button (the answer to the question of the step ST34 is Yes), it drives the scanner section 4 to start reading of the document (ST35). Second image data f̲ created by reading the document is stored in the memory 78 (ST36).

Subsequently, the CPU 77 compares the reference image data a corresponding to the chart b prestored in the memory 78, with the second image data f̲, thereby detecting errors in each diagnosis item for the entire copy machine 1, i.e. both the scanner section 4 and the printer section 6 (ST37). At this time, the diagnosis items included in the diagnosis results contain items sorted in a first image forming characteristic group due to a displacement of a component part of the entire copy machine 1, and also items sorted in a second image forming characteristic group due to a change in control parameter occurring at the time of forming an image on a paper sheet. Each item is subjected to error calculation.

The CPU 77 informs the user or the maintenance stuff of the diagnosis results (ST38). Subsequently, the CPU 77 changes a control parameter corresponding to each item sorted in the second image forming characteristic group, thereby performing automatic adjustment (ST39).

As described above, the entire copy machine 1 can be diagnosed using the existing system, which means that a stable image forming characteristic can be always obtained at low cost using a simple structure.

Figure 15:
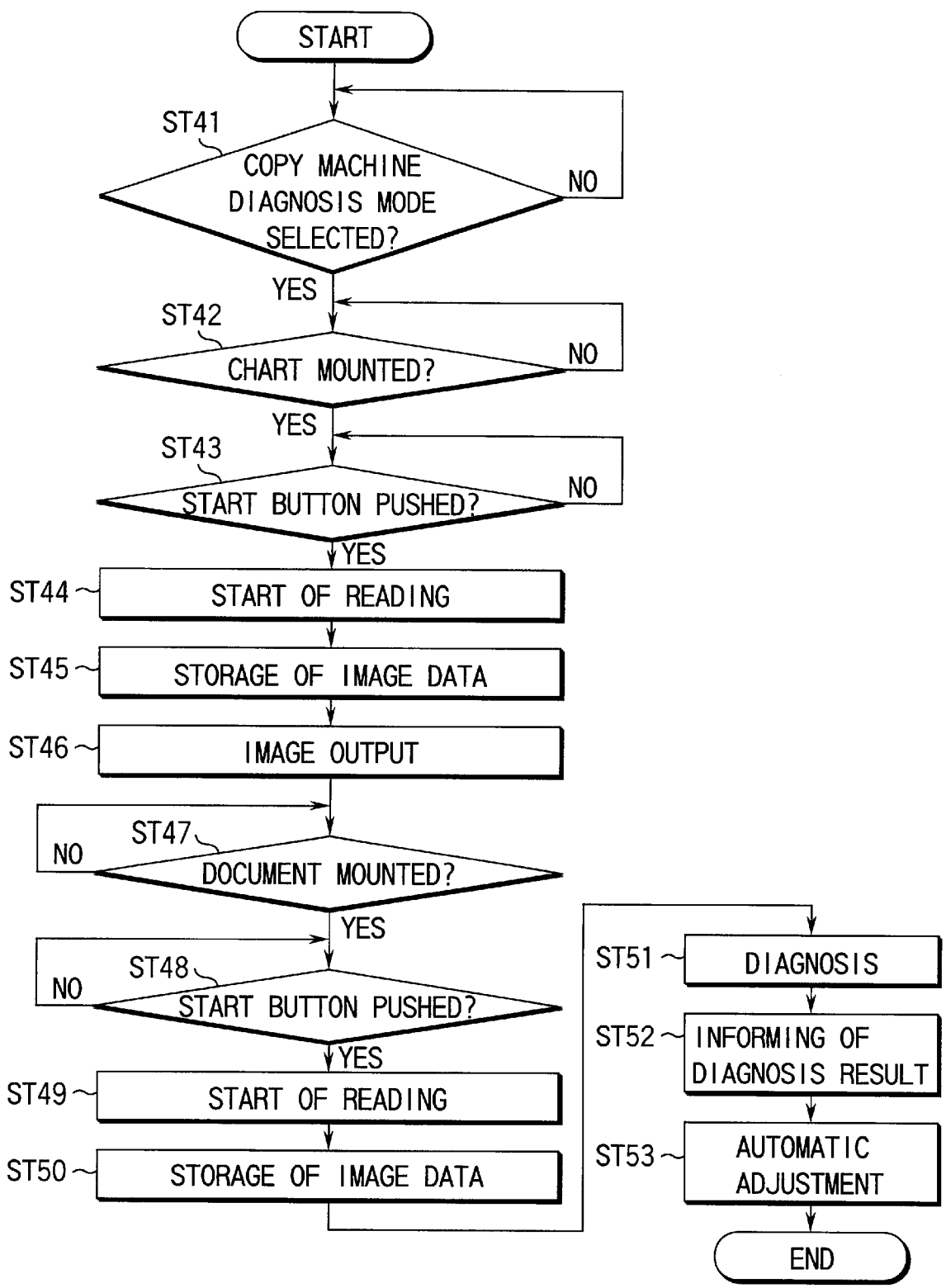
FIG. 15 is a flowchart useful in explaining a second diagnosis method for diagnosing the entire copy machine of the invention.

Referring to FIGS. 11 and 15, another diagnosis method for diagnosing the entire apparatus will be described.

When the CPU 77 has detected the selection of a copy machine diagnosis mode for diagnosing the entire copy machine 1 (the answer to the question of a step ST41 is Yes), it detects whether or not a document with a chart b used for diagnosis is placed on the document table 11 (ST42). When the CPU 77 has detected the document on the table (the answer to the question of the step ST42 is Yes), it detects whether or not a start button for instructing the start of reading of a document has been pushed (ST43).

When the CPU 77 has detected the pushing of the start button (the answer to the question of the step ST43 is Yes), it drives the scanner section 4 to start reading of the document with the chart b (ST44). First image data c created by reading the chart b is stored in the memory 78 (ST45). Subsequently, the CPU 77 drives the printer section 6 to print a second output image d on a paper sheet on the basis of the first image data c (ST46).

After that, the CPU 77 detects whether or not the document with the second output image d is placed on the document table 11 (ST47). When the CPU 77 has detected the document on the table (the answer to the question of the step ST47 is Yes), it detects whether or not the start button for instructing the start of reading of a document has been pushed (ST48).

When the CPU 77 has detected the pushing of the start button (the answer to the question of the step ST48 is Yes), it drives the scanner section 4 to start reading of the document (ST49). Third image data g created by reading the document is stored in the memory 78 (ST50).

Subsequently, the CPU 77 compares the third image data g with the first image data c previously stored in the memory 78, thereby detecting errors in the entire copy machine 1, i.e. errors included in the scanner section 4 and the printer section 6 (ST51). At this time, the diagnosis items included in the diagnosis results contain, as in the above-described cases, items sorted in the first image forming characteristic group and items sorted in the second image forming characteristic group. Each item is subjected to error calculation.

The CPU 77 informs the user or the maintenance stuff of the diagnosis results (ST52). Subsequently, the CPU 77 changes a control parameter corresponding to each item sorted in the second image forming characteristic group, thereby performing automatic adjustment (ST53).

As described above, the entire copy machine 1 can be diagnosed using the existing system, which means that a stable image forming characteristic can be always obtained at low cost using a simple structure.

In summary, by the diagnosis method of the invention for diagnosing an optical device installed in an image reading apparatus or an image forming apparatus, errors can be detected, for the scanner section alone, for the printer section alone, or for the entire image forming apparatus, in a plurality of diagnosis items that are sorted into a first characteristic group (which requires adjustment in hardware) and a second characteristic group (in which adjustment can be performed in a software manner). Errors in diagnosis items included in the second characteristic group can be automatically adjusted by changing control parameters to appropriate values.

Accordingly, it is not necessary to prepare an external device for diagnosing each component part of the image forming apparatus or the image reading apparatus, which means that diagnosis can be executed using the existing system of a simple structure. Also, in the invention, diagnosis is performed without depending upon the skill of, for example, a maintenance stuff, and therefore the invention can always provide stable image quality.

As described above, the invention can provide a diagnosis method for diagnosing an optical device installed in an image reading apparatus or an image forming apparatus, the method always enabling provision of stable image quality at low cost and using a simple system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of diagnosing an optical device having a plurality of photoelectric elements that are arranged in a scanning line in a main scanning direction, for receiving light reflected from a document and outputting a signal corresponding to an amount of light received, comprising:

a first step of reading, along a predetermined scanning line, a figure that consists of a first straight line perpendicular to the main scanning direction, second and third straight lines parallel to each other and intersect the first straight line at an acute angle, using the photoelectric elements of the optical device opposed to the figure with a predetermined space interposed therebetween;

a second step of detecting respective positions of first, second and third intersections between the scanning line and each of the first, second and third straight lines of the figure, and also detecting output levels of signals corresponding to the intersections, on the basis of signals output when the figure has been read along the scanning line; and a third step of comparing the detected positions of the intersections with positions of respective predetermined points which are to detect the intersections, and the detected output levels of the signals corresponding to the intersections with respective predetermined output levels of signals corresponding to respective predetermined points, thereby detecting an error due to an attachment position of the optical device.

2. A method according to claim 1, wherein the second straight line intersects an end of the first straight line, and the third straight line intersects the other end of the first straight line.

3. A method according to claim 2, wherein the optical device includes an image forming lens for forming image light reflected from a document on the photoelectric elements which are arranged in position corresponding to an image surface, and the first step uses a predetermined chart that has at least four of said figures and arranged in position corresponding to an object surface of the image forming lens and opposed to the photoelectric elements.

4. A method according to claim 3, wherein the four figures of the chart are arranged to form a rectangle that consists of four corner points each formed of one end of a corresponding one of the first straight lines of the four figures, and also that consists of two diagonal lines each formed by connecting the second straight lines of two of the figures.

5. A method according to claim 1, wherein a main-scanning-directional displacement of the scanning line is detected by comparing, with a position of a predetermined point, the position of the intersection between the scanning line and the first straight line of the figure detected in the second step.

6. A method according to claim 1, wherein:

in the third step, a difference between a distance from the detected first intersection to the detected second intersection and a distance from the detected first intersection to the detected third intersection is compared with a predetermined minimum value, thereby detecting a displacement of the scanning line in a direction perpendicular to the main scanning direction.

7. A method according to claim 1, wherein an output level of at least one of the intersections detected in the second step is compared with a predetermined output level, thereby detecting a focus error of the scanning line.

8. A method according to claim 1, further comprising:

a fourth step of comparing an output level of a signal corresponding to each of at least two of the intersections detected in the second step, with a predetermined output level, thereby detecting an error in focus of each of the at least two of the intersections; and a fifth step of detecting an inclination of the scanning line with respect to a light advancing direction on the basis of the error in focus of said each of the at least two of the intersections.

9. A method according to claim 1, wherein a distance between the second and third intersections detected in the second step is compared with a predetermined distance, thereby detecting an inclination of the scanning line with respect to the main scanning direction.

10. A method according to claim 1, wherein:

the optical device includes a plurality of line sensors having photoelectric elements that are arranged parallel to the main scanning direction and correspond to respective colors;

in the first step, the scanning line includes a middle point of the first straight line, and the figure is read by each line sensor along the scanning line;

in the second step, each line sensor detects respective positions of first, second and third intersections for a corresponding color between the scanning line and each of the first, second and third straight lines of the figure; and in the third step, a displacement of that one of the line sensors in the main scanning direction which corresponds to a first color is detected by comparing an output level of a signal corresponding to the first intersection for the first color, with a predetermined output level, and a displacement of that one of the line sensors in the main scanning direction which corresponds to a second color is detected by comparing an output level of a signal corresponding to the first intersection for the second color, with a predetermined output level, thereby detecting, on the basis of the displacements, an inclination of each scanning line with respect to a sub scanning direction perpendicular to the main scanning direction.

* * * * *